United States Patent [19]

Rademachers et al.

[11] Patent Number: 4,631,089
[45] Date of Patent: Dec. 23, 1986

[54] COLOR-INTENSIVE IRON OXIDE BLACK PIGMENTS AND PROCESS FOR THEIR PRODUCTION

[75] Inventors: Jakob Rademachers; Rolf Naumann; Günther Teichmann, all of Krefeld, Fed. Rep. of Germany

[73] Assignee: Bayer Aktiengesellschaft, Leverkusen, Fed. Rep. of Germany

[21] Appl. No.: 668,970

[22] Filed: Nov. 7, 1984

[30] Foreign Application Priority Data

Nov. 19, 1983 [DE] Fed. Rep. of Germany ....... 3341885

[51] Int. Cl.$^4$ .............................................. C09C 1/22
[52] U.S. Cl. .................... 106/304; 106/23; 423/138
[58] Field of Search .......................... 106/304, 20, 23; 252/519; 423/138

[56] References Cited

U.S. PATENT DOCUMENTS 3,836,889  5/1962  Frey .................................... 106/304
4,054,639 10/1977  Garberi et al. .
4,358,431 11/1982  Brunn et al. ........................ 106/304
4,382,822  5/1983  Mayer et al. ........................ 106/304

FOREIGN PATENT DOCUMENTS 2261980  9/1975  France .

OTHER PUBLICATIONS

Chemical Abstract, vol. 82, No. 45924p, p. 168, Feb. 24, 1975.

Primary Examiner—Amelia B. Yarbrough
Attorney, Agent, or Firm—Connolly and Hutz

[57] ABSTRACT

Highly pure and highly color intensive black anisometric magnetite iron oxide pigment having an FeO content of from 26 to 29% by weight and manganese content of less than 0.1% by weight, said pigment further having a specific BET surface area of from 5 to 15 square meters per gram and being needle shaped particles with an average needle diameter of 0.1 to 0.2 μm and an average needle length of from 0.6 to 0.8 μm are produced by producing α-FeOOH particles by alkali precipitation of an iron salt solution with a nuclear formation stage oxidation and a pigment growth stage oxidation followed by reduction and passivation.

7 Claims, No Drawings

COLOR-INTENSIVE IRON OXIDE BLACK PIGMENTS AND PROCESS FOR THEIR PRODUCTION

BACKGROUND OF THE INVENTION

This invention relates to new anisometric iron oxide black pigments of great purity and color intensity, a process for the production of such iron oxide black pigments and the use thereof for color substrates.

Iron oxide black pigments are mixed oxides of divalent and trivalent iron corresponding to the composition of magnetite, $Fe_3O_4$. They may be obtained by the oxidation of metallic or divalent iron or by the reduction of trivalent iron.

The production of magnetites by the reduction of iron(III) compounds is mainly used in the field of magnetic pigments, in which needle-shaped magnetites, in particular, are used either directly as magnetic pigment or as intermediate for the production of ferrimagnetic $\gamma$-$Fe_2O_3$ (Ullmanns Encylopädie der techischen Chemie, 4th Edition, Volume 18, page 643, Verlag Chemie, Weinheim, 1979). Magnetites prepared by this process have neither a pure color tone nor exceptional color intensity and have therefore not become established as color pigments.

The iron oxide black pigments obtained on a technical scale by the aniline process of oxidation of metallic iron shown an increasingly strong brown tinge at higher color intensities. This is due to an increased proportion of fine particles in the primary grain distribution.

The isometric iron oxide black pigments obtained in the neutral to slightly basic region from commericial iron salt solutions by precipitation and oxidation have the disadvantage that they readily incorporate in the lattice structure thereof the metal impurities present in the solutions. In particular, the manganese impurities frequently present in iron salt solutions are completely incorporated, and these also produce a brown tinge in black pigment.

BRIEF DESCRIPTION OF THE INVENTION

It is an object of the present invention to provide anisometric iron oxide black pigments having high black color intensity and a pure black color tone.

These requirements are fulfilled by black pigments based on iron oxide, of anisometric magnetites having an average needle diameter of from 0.1 to 0.2 $\mu$m and an average needle length of from 0.6 to 0.8 $\mu$m, a specific BET surface area of from 5 to 15 $m^2/g$, an FeO content of from 26 to 29%, by weight, and a manganese content of less than 0.1%, by weight, based on the black pigment.

Particularly preferred for this purpose are those black pigments which have a specific BET surface area of from 7 to 10 $m^2/g$.

Another object of the present invention is to develop high purity black pigments which are suitable for coloring substrates in the food industry, such as packaging materials, or for use in cosmetics.

DETAILED DESCRIPTION

The requirements are fulfilled by pigments which, in addition to the properties mentioned above, satisfy the requirements that the content of copper, antimony, chromium, zinc and barium sulphate is less than 0.01%, by weight, of each of these constituents, with a total content of all of them of not more than 0.02%, by weight; the lead content is less than 0.002%, by weight; the content of arsenic, selenium and mercury is less than 0.0001%, by weight; and the content of cadmium, tellurium, thallium, uranium and chromate (VI) is less than 0.00005%, by weight.

The present invention also relates to a process for the production of such black pigments. The process is characterised in that $\alpha$-FeOOH having a specific BET surface area of from 10 to 20 $m^2/g$, average needle widths of from 0.1 to 0.2 $\mu$m and average needle lengths of from 0.6 to 0.8 $\mu$m is obtained from iron salt solutions by the addition of alkali with oxidation in two stages (namely the nuclear formation state and the pigment growth stage), then reduced at from 350° to 500° C., preferably from 400° to 450° C., then passivated at from 25° to 250° C., preferably from 100° to 200° C., under an atmosphere having a low oxygen partial pressure, and finally milled.

By this procedure, a large proportion of the impurities present in the iron salt solutions (especially manganese) remain in solution, with the result that no brown tinge is observed in the finely-divided color-intensive black pigments obtained. It has been found that a manganese content below 0.1%, by weight, has no effect on the color tone. It was also surprisingly found that higher color intensities may be obtained at low specific surface areas, so that thermostable products may be obtained. Thus, the color intensities obtained with specific BET surface areas of 8 $m^2/g$ may be higher by more than 50% than those obtained with aniline black pigments having specific BET surface areas of about 15 $m^2/g$.

Commercial iron salt solutions, in particular iron sulphate or iron chloride solutions, are used as starting materials for the production of the pigments according to the present invention. It is particularly preferred to use iron sulphates obtained in the form of heptahydrates in tanneries. If the trivalent metal content is too high, these may advantageously be precipitated by adjustment of the pH to 4.5 prior to the preparation.

To obtain $\alpha$-FeOOH from these solutions, alkalies (such as sodium hydroxide solution, soda solution or magnesite) are added in the first stage, the nuclear formation stage, in the quantity required to precipitate about half the iron in the form of hydroxide. This proportion is then oxidized to FeOOH, preferably by gassing with air in stirrer vessels. The oxidation may also be carried out with other oxidizing agents, such as nitrates or peroxides. After termination of the first stage oxidation process, which takes place at from 30° to 35° C., further iron sulphate solution is added and the suspension is heated to from 70° to 90° C. Second stage oxidation (pigment growth) then takes place while the pH is maintained constant at from 3.5 to 4.5 by the addition of alkalies. This process of pigment formation is continued by further addition of iron sulphate solution until the desired average needle width of from 0.1 to 0.2 $\mu$m and average needle lengths of from 0.6 to 0.8 $\mu$m are obtained with a specific BET surface area of from 10 to 20 $m^2/g$. These advantageous conditions for the black pigment are generally obtained when the $\alpha$-FeOOH has a growth factor of from 10 to 15. The term growth factor is defined by the ratio of the amount of pigment obtained to the amount of seeds introduced. The 10 to 15-fold quantity of goethite is then obtained, based on the quantity of nuclei put into the process.

After filtration, vigorous washing and drying, the α-FeOOH is reduced to Fe$_3$O$_4$. This step of the process is preferably carried out in indirectly heated rotary drums or rotary tube furnaces. The reducing agents used may be reducing gases, for example hydrogen, carbon monoxide or mixtures thereof. Reduction should be carried out under mild conditions, but completely, so that no sintering of pigment crystals occurs. At the same time, over-reduction should be avoided. The reduction temperatures are from 350° to 500° C., preferably from 400° to 450° C. With this procedure, an FeO content of from 30 to 31%, by weight, is obtained when steam is used to an extent of from 10 to 30 vol.-% in proportion to hydrogen. The black pigment obtained is sensitive to oxidation in this form. By passing nitrogen over it together with up to about 10 vol.-% of air at from 25° to 250° C., preferably from 100° to 200° C., the pigment is passivated against atmospheric oxidation due to lowering of the FeO content to about 26 to 29%, by weight.

When the ground pigments obtained are subjected to objective color measurements and the results interpreted by the CIELAB-System (DIN 6174), they show substantially less variety of color and higher color intensities than the conventional black pigments available on the market. They are distinctly more bluish black with no brown tinge.

The black pigments of this invention have utility as an improved color producing agent for coatings and lacquers as well as plastics. Additionally, the virtue of the exceeding low level of impurities, the pigments can be used as coloring agents in cosmetics or in articles used in conjunction with the food industry, for example, in packaging materials.

The present invention is described in more detail in the following Example with an intended limitation of the invention.

EXAMPLE

A 30% sodium hydroxide solution is added, with stirring to an aqueous solution of iron sulphate, obtained from tanneries, containing 150 g/l FeSO$_4$, until 40% of the iron is precipitated as iron(III) hydroxide. The precipitated iron is then oxidized to the trivalent state by gassing with air at temperatures of from 30° to 35° C. In this process, the pH drops from the initial value of 6 to 3.5. At this stage, formation of nuclei is completed. Additional iron sulphate is then added and the suspension is heated to 80° C., gassing with air being continued, with stirring, while the pH is maintained at a constant value of 4 by the addition of sodium hydroxide solution. This procedure is continued until 14 times the quantity of α-FeOOH obtained from nuclear formation has been reached. After filtration and washing on a rotary filter, the filter cake is spray dried.

The goethite obtained, which has a BET surface area of 12 m$^2$/g, a needle width of 0.15 μm and a needle through of 0.7 μm, is reduced by hydrogen with the addition of 20 vol.-% of steam in an indirectly heated rotary furnace at reaction temperatures of from 425° to 450° C. to yield Fe$_3$O$_4$ having an FeO content of 30.5%, by weight. After intermediate cooling, treatment with nitrogen containing 10% air is carried out in countercurrent in another rotary furnace at from 100° to 150° C. At this stage, the FeO content is reduced to 28%, by weight. After milling in a ring roll mill, an oxidation-resistant black pigment having a specific BET surface area of 8 m$^2$/g, an averge needle width of 0.15 μm and an average needle length of 0.7 μm is obtained. The manganese content is 0.078%, by weight; the zinc content 0.006%, by weight; the copper and chromium contents are each 0.002%, by weight; the barium sulphate content 0.005%, by weight; the lead content 0.0008%, by weight; and the antimony, arsenic, selenium, mercury, cadmium, tellurium, thallium, uranium and chromate(VI) contents are each less than 0.00005%, by weight. The CIELAB-C/2 grade color values measured according to DIN 53 236 after reduction with white (mixing of black pigment with a commercial titanium dioxide white pigment in proportions, by weight, of 1:5) and converted according to DIN 6174 gave the following results in alkyd-F48 lacquer compared with the trade product Bayferrox 318 (both brand products of BAYER AG):

Difference in red-green content: $\Delta a^* = -0.2$
Difference in yellow-blue content: $\Delta b^* = -1.1$
Difference in color variety: $\Delta c^*_{ab} = -1.1$
Relative color intensity: % F rel = 180

The black pigment obtained thus has a distinctly more bluish black tone without any brown tinge and has an 80% high color intensity than the comparison pigment which has a specific BET surface area of 14 m$^2$/g.

What is claimed is:

1. Color intensive black anisometric magnetite iron oxide pigment having an FeO content of from 26 to 29% by weight and manganese content of less than 0.1% by weight, said pigment further having a specific BET surface area of from 5 to 15 square meters per gram and being needle shaped particles with an average needle diameter of 0.1 to 0.2 μm and an average needle length of from 0.6 to 0.8 μm.

2. Black pigment according to claim 1 wherein the specific BET surface area is from 7 to 10 m$^2$/g.

3. Black pigments according to claim 1 wherein the content of copper, antimony, chromium, zinc and barium sulphate is less than 0.01%, by weight, each, with a total of not more than 0.02%, by weight, the content of lead is less than 0.002%, by weight, the content of arsenic, selenium and mercury is less than 0.0001%, by weight, and the content of cadmium, tellurium, thallium, uranium and chromate (VI) is less than 0.00005%, by weight.

4. The process for production of black pigment according to claim 1 which comprises:
(a) producing α-FeOOH particles having specific BET surface areas from 10 to 20 square meters per gram, average needle widths of from 0.1 to 0.2 μm and average needle lengths of from 0.6 to 0.8 μm by adding an alkali to a solution of iron salts, subjecting the resulting mixture to a first oxidation in the nuclear formation stage and a second oxidation in the pigment growth stage,
(b) reducing the α-FeOOH particles at 350° to 500° C. to a predetermined FeO content,
(c) passivating the reduced particles at 25° to 250° C. under an atmosphere with a low oxygen partial pressure, and
(d) milling the passivated pigment.

5. The process for production of black pigment according to claim 4 wherein the nuclear formation stage oxidation in the preparation of α-FeOOH is at a temperature from 30° to 35° C. and the pigment formation stage oxidation is at a temperature from 70° to 90° C.

6. The process for production of black pigment according to claim 4 wherein growth factor of from 10 to 15 is maintained in the formation of α-FeOOH.

7. The process for production of black pigment according to claim 4 wherein reduction of the α-FeOOH is by means of a rotary furnace with hydrogen and from 10 to 30 volume percent of steam.

* * * * *